US008012302B2

(12) United States Patent
Jucker et al.

(10) Patent No.: US 8,012,302 B2
(45) Date of Patent: Sep. 6, 2011

(54) MOISTURE-CURING COMPOSITIONS CONTAINING SILANE-FUNCTIONAL POLYMERS AND AMINOSILANE ADDUCTS WITH GOOD ADHESIVE PROPERTIES

(75) Inventors: Barbara Jucker, Zürich (CH); Marcel Oertli, Zürich (CH); Pierre-André Buetikofer, Wallisellen (CH); Urs Burckhardt, Zürich (CH)

(73) Assignee: Sika Technology AG, Baar (CH)

( * ) Notice: Subject to any disclaimer, the term of this patent is extended or adjusted under 35 U.S.C. 154(b) by 120 days.

(21) Appl. No.: 12/087,988

(22) PCT Filed: Jan. 24, 2007

(86) PCT No.: PCT/EP2007/050700
§ 371 (c)(1),
(2), (4) Date: Dec. 2, 2008

(87) PCT Pub. No.: WO2007/085622
PCT Pub. Date: Aug. 2, 2007

(65) Prior Publication Data
US 2009/0081470 A1 Mar. 26, 2009

(30) Foreign Application Priority Data
Jan. 26, 2006 (EP) .................................... 06100911

(51) Int. Cl.
C09J 7/02 (2006.01)
C07F 7/18 (2006.01)
(52) U.S. Cl. ...................................... 156/329; 524/188
(58) Field of Classification Search .................. 524/188; 156/329
See application file for complete search history.

(56) References Cited

U.S. PATENT DOCUMENTS

| | | | |
|---|---|---|---|
| 5,109,064 A * | 4/1992 | Wakabayashi et al. | 525/100 |
| 5,364,955 A | 11/1994 | Zwiener et al. | |
| 5,756,751 A * | 5/1998 | Schmalstieg et al. | 548/110 |
| 5,854,338 A * | 12/1998 | Hovestadt et al. | 524/591 |
| 5,908,948 A * | 6/1999 | Roesler et al. | 556/421 |
| 6,001,946 A * | 12/1999 | Waldman et al. | 528/28 |
| 6,005,047 A * | 12/1999 | Shaffer et al. | 524/590 |
| 6,197,912 B1 * | 3/2001 | Huang et al. | 528/28 |
| 6,265,517 B1 | 7/2001 | Stuart | |
| 6,310,170 B1 | 10/2001 | Johnston et al. | |
| 6,444,325 B1 * | 9/2002 | Roesler et al. | 428/447 |
| 6,626,988 B1 * | 9/2003 | Schmalstieg et al. | 106/287.25 |
| 6,703,453 B1 * | 3/2004 | Schmalstieg et al. | 525/453 |
| 2004/0181025 A1 | 9/2004 | Schindler et al. | 528/38 |
| 2004/0204539 A1 * | 10/2004 | Schindler et al. | 524/588 |
| 2005/0101753 A1 | 5/2005 | Schindler et al. | |
| 2006/0122338 A1 * | 6/2006 | Roesler et al. | 525/453 |
| 2006/0264545 A1 * | 11/2006 | Wakabayashi et al. | 524/394 |
| 2007/0203297 A1 * | 8/2007 | Wakabayashi et al. | 525/187 |
| 2007/0208108 A1 * | 9/2007 | Wakabayashi et al. | 523/200 |

FOREIGN PATENT DOCUMENTS

| | | |
|---|---|---|
| DE | 199 29 011 A1 | 12/2000 |
| EP | 0 596 360 A1 | 5/1994 |
| EP | 1 529 813 A1 | 5/2005 |
| WO | WO 01/12693 A1 | 2/2001 |
| WO | WO 03/014226 A1 | 2/2003 |
| WO | WO 03/018658 A1 | 3/2003 |
| WO | WO 2005/003201 A2 | 1/2005 |

* cited by examiner

Primary Examiner — Robert Loewe
(74) Attorney, Agent, or Firm — Oliff & Berridge, PLC

(57) ABSTRACT

Moisture-curing compositions include at least one silane-functional polymer P with at least two terminal groups of formula (I) and at least one reaction product R which is produced from at least one aminosilane AS with at least one primary amino group and at least one silane group-free alkene M which is capable of entering in 1,4 addition reactions with primary amino groups. The compositions have improved adhesive properties and are especially suitable for use as adhesives, sealing materials or coatings, especially as elastic adhesive or sealing materials.

25 Claims, No Drawings

MOISTURE-CURING COMPOSITIONS CONTAINING SILANE-FUNCTIONAL POLYMERS AND AMINOSILANE ADDUCTS WITH GOOD ADHESIVE PROPERTIES

FIELD OF THE INVENTION

The invention relates to moisture-curing compositions comprising silane-functional polymers and having good adhesion properties that are suitable for use as elastic adhesives, sealants or coatings.

DESCRIPTION OF THE PRIOR ART

Moisture-curing compositions based on silane-functional polymers are known and their applications include being used as elastic adhesives, sealants, and coatings. They are free from isocyanate groups and for that reason represent a toxicologically preferred alternative to the isocyanate-containing polyurethane systems.

Among the silane-functional polymers a particular position is occupied by those which carry α-functional silane end groups, on account more particularly of their high moisture reactivity. Polymers of this kind and compositions comprising them have been described in WO 03/018658 A1, for example. For application as elastic adhesives, sealants or coatings, however, the systems described have weaknesses, in relation more particularly to their storage stability and, after curing, in their extensibility and substrate adhesion.

WO 03/014226 A1 describes a method that allows the storage stability of such compositions to be enhanced through additions of highly reactive α-functional silanes as chemical water scavengers, examples being alkoxymethyltrialkoxysilanes or carbamatomethylalkoxysilanes.

EP 1 529 813 A1 and WO 2005/003201 A2 describe routes that allow the mechanical properties, more particularly the extensibility, of such compositions to be enhanced by addition of α-functional dialkoxysilanes, and/or of NCO-reactive α-functional silanes, without detriment to the curing characteristics.

For application more particularly as elastic adhesives or sealants it is critically important that the compositions, after curing, possess good adhesion to a very wide range of substrates. A substantial disadvantage of the prior-art systems based on silane-functional polymers with α-functional silane groups, however, is specifically the fact that their adhesion to numerous substrates is inadequate. More particularly, the adhesion between cured composition and substrate is lost, often irreversibly, on severe moisture exposure, such as through prolonged immersion in water or by hot steam treatment (for example, at 70° C. and 100% humidity), for example.

SUMMARY OF THE INVENTION

It is an object of the present invention, therefore, to provide moisture-curing compositions that are based on polymers with α-functional silane groups and that exhibit enhanced adhesion properties and are therefore suitable more particularly for use as adhesives, sealants or coatings, more particularly as an elastic adhesive or sealant.

Surprisingly it has been found that moisture-curing compositions as per claim 1 achieve these objects. More particularly, the adhesion to the substrate is retained even on severe moisture exposure, as for example through prolonged immersion in water or through hot steam treatment (for example, at 70° C. and 100% humidity).

Additionally provided has been a method of adhesive bonding or sealing as per claim 20 or 21, leading to adhesively bonded or sealed articles as per claim 23, 24 or 25.

Further embodiments are subject matter of the dependent claims.

DESCRIPTION OF THE PREFERRED EMBODIMENTS

The invention provides moisture-curing compositions comprising
a) at least one silane-functional polymer P having at least two end groups of the formula (I)

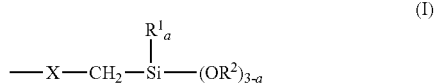

where
$R^1$ is an alkyl group having 1 to 8 C atoms, more particularly a methyl group or an ethyl group;
$R^2$ is an alkyl group having 1 to 5 C atoms, more particularly a methyl group or an ethyl group or an isopropyl group;
a is 0, 1 or 2; and
X is a divalent radical selected from the group consisting of —NH—CO—N($R^3$)—, —NH—CO—S—, —NH—CO—O—, —O—CO—NH—, —N($R^3$)—CO—NH—, and —S—CO—NH—,
and where $R^3$ is a hydrogen atom or is a linear or branched hydrocarbon radical having 1 to 20 C atoms which optionally contains cyclic fractions and which optionally has at least one functional group selected from the group consisting of alkoxysilyl, ether, sulfone, nitrile, nitro, carboxylic ester, sulfonic ester, and phosphonic ester;
b) at least one reaction product R prepared from
at least one aminosilane AS having at least one primary amino group, and
at least one silane-group-free alkene M which is capable of undergoing 1,4-addition reactions with primary amino groups.

In the present document the term "polymer" embraces on the one hand a collective of chemically uniform macromolecules which nevertheless differ in respect of degree of polymerization, molar mass, and chain length and which have been prepared by a polymerization reaction (addition polymerization, polyaddition, polycondensation). On the other hand the term also embraces derivatives of such a collective of macromolecules from polymerization reactions, in other words compounds which have been obtained by reactions, such as addition reactions or substitution reactions, for example, of functional groups on existing macromolecules and which may be chemically uniform or chemically nonuniform. The term further embraces what are known as prepolymers—that is, reactive oligomeric preadducts whose functional groups are involved in the construction of macromolecules.

The term "silane" is used in the present document to refer to organoalkoxysilanes, in other words compounds in which there is at least one, typically two or three, alkoxy group(s) attached directly to the silicon atom (via an Si—O bond), and there is also at least one organic radical attached directly to the silicon atom (via an Si—C bond). Correspondingly, the term "silane group" refers to the silicon-containing group attached to the organic radical of an organoalkoxysilane. The silanes, or their silane groups, have the property of hydrolyzing on contact with moisture. This hydrolysis is accompanied by the formation of organosilanols, in other words organosilicon compounds containing one or more silanol groups (Si—OH groups), and, through subsequent condensation reactions, of organosiloxanes, in other words organosilicon compounds containing one or more siloxane groups (Si—O—Si groups). The term "silane-functional" refers to compounds, more particularly polymers, which contain silane groups.

Silanes or silane groups referred to as being "α-functional" are those whose organic radical in the α position (position 1) to the silicon atom is substituted by a functional group, such as an isocyanate group or an amino group, for example. Correspondingly, silanes or silane groups are referred to as being "γ-functional" when their organic radical in the γ position (position 3) to the silicon atom is substituted by a functional group.

Silane designations with functional groups as prefixes, such as "aminosilane" or "isocyanatosilane", for example, identify silanes which carry the stated functional group on the organic radical as a substituent. Identifications such as, "α-aminosilane" or "γ-aminosilane", for example, indicate that a stated functional group is in a specific position to the silicon atom.

The term "polyurethane polymer" encompasses all polymers which are prepared by the diisocyanate polyaddition process. This also includes those polymers which are virtually or entirely free of urethane groups. Examples of polyurethane polymers are polyether-polyurethanes, polyester-polyurethanes, polyether-polyureas, polyureas, polyester-polyureas, polyisocyanurates or polycarbodiimides.

In the present document the term "Michael acceptor" identifies silane-group-free alkenes M which on account of the double bonds they contain, activated by electron acceptor radicals, are capable of undergoing 1,4-addition reactions in a manner analogous to Michael addition (hetero-Michael addition) with primary amino groups ($NH_2$ groups). A Michael acceptor may be monofunctional or polyfunctional, i.e., may contain one or more such activated double bonds and, accordingly, may undergo 1,4-addition reactions with one or more primary amino groups.

The moisture-curing composition comprises at least one silane-functional polymer P having end groups of the formula (I) above.

Polymers of the type of polymer P are described for example in WO 03/018658. These polymers contain α-functional silane end groups which on account of their electronic structure have the capacity very rapidly to hydrolyze and further to condense. As a result, the moisture reactivity of such polymers is very high. They can therefore be used to prepare moisture-curing compositions which exhibit high cure rates even without catalysts or with only small amounts of catalysts, more particularly metal catalysts. More particularly, with polymers P of this kind containing di- or monoalkoxysilane end groups, the cure rates obtained in moisture-curing compositions are still sufficient, something which, with polymers containing corresponding γ-functional silane groups, is not possible or is possible only using undesirably high amounts of catalyst.

The polymers P preferably carry dialkoxysilane groups; i.e., a in formula (I) is preferably 1. Compositions comprising such polymers P have the advantage of possessing particularly good mechanical properties after curing. In comparison to the use of the polymers P carrying trialkoxysilane groups, the curing of the polymer produces a lower crosslinking density. As a result, compositions comprising polymers P with dialkoxysilane groups have an especially high elasticity after curing, more particularly an especially high extensibility in conjunction with high tensile strength. This is advantageous more particularly for their use as elastic adhesives, sealants, and coatings.

Polymers P used in a first embodiment are polymers P1, in which the divalent radical X in formula (I) is —NH—CO—N($R^3$)— or —NH—CO—S— or —NH—CO—O—. The polymers P1 are obtainable from the reaction of a polyurethane polymer P11, containing isocyanate groups, with an α-aminosilane, an α-mercaptosilane or an α-hydroxysilane, the proportion in which the silane is used relative to the isocyanate groups of the polyurethane polymer P11 being stoichiometric or slightly superstoichiometric.

Particularly suitable α-aminosilanes for reaction with a polyurethane polymer P11 containing isocyanate groups are axaminosilanes having a primary amino group ($NH_2$ group), also referred to below as "primary α-aminosilanes", such as (aminomethyl)trimethoxysilane, (aminomethyl)methyldimethoxysilane, and (aminomethyl)dimethylmethoxysilane; α-aminosilanes having a secondary amino group (NH group), also referred to below as "secondary α-aminosilanes", examples being analogs of the stated primary α-aminosilanes that carry a hydrocarbon radical on the nitrogen atom, such as a methyl, ethyl, butyl, cyclohexyl or phenyl group, for example, such as (N-cyclohexylaminomethyl)trimethoxysilane, (N-cyclohexylaminomethyl)methyldimethoxysilane, (N-phenylaminomethyl)trimethoxysilane, and (N-phenylaminomethyl)methyldimethoxysilane, for example; multiply silane-functional secondary α-aminosilanes such as, for example, bis(trimethoxysilylmethyl)amine; and also the products of the Michael-like addition of the stated primary α-aminosilanes with Michael acceptors such as maleic diesters, fumaric diesters, citraconic diesters, acrylic esters, methacrylic esters, cinnamic esters, itaconic diesters, vinylphosphonic diesters, vinylsulfonic aryl esters, vinyl sulfones, vinyl nitriles, 1-nitroethylenes or Knoevenagel condensation products such as those, for example, of malonic diesters and aldehydes such as formaldehyde, acetaldehyde or benzaldehyde; and also the analogs of all of the stated α-aminosilanes with ethoxy groups or isopropoxy groups instead of the methoxy groups on the silicon atom.

Of the abovementioned products of a Michael-like addition, mention should be made more particularly of the reaction products of primary α-aminosilanes with dimethyl, diethyl or dibutyl maleate, tetrahydrofurfuryl, isobornyl, hexyl, lauryl, stearyl, 2-hydroxyethyl or 3-hydroxypropyl acrylate, dimethyl, diethyl or dibutyl phosphonate, acrylonitrile, 2-pentenenitrile, fumaronitrile or β-nitrostyrene.

Examples of suitable α-mercaptosilanes for reaction with a polyurethane polymer P11 containing isocyanate groups are (mercaptomethyl)trimethoxysilane, (mercaptomethyl)methyldimethoxysilane, and (mercaptomethyl)dimethylmethoxysilane, and also the analogs of the stated α-mercaptosilanes with ethoxy groups or isopropoxy groups instead of the methoxy groups on the silicon atom.

Examples of suitable α-hydroxysilanes for reaction with a polyurethane polymer P11 containing isocyanate groups are (hydroxymethyl)trimethoxysilane, (hydroxymethyl)methyldimethoxysilane, and (hydroxymethyl)dimethylmethoxysilane, and also the analogs of the stated α-hydroxysilanes with ethoxy groups or isopropoxy groups instead of the methoxy groups on the silicon atom.

The polyurethane polymer P11 containing isocyanate groups is for example obtainable by the reaction of at least one polyol with at least one polyisocyanate, more particularly a diisocyanate. This reaction may take place by the polyol and the polyisocyanate being reacted by typical methods, at temperatures from 50° C. to 100° C., for example, where appropriate with the accompanying use of suitable catalysts, the polyisocyanate being metered in such a way that its isocyanate groups are in a stoichiometric excess in relation to the hydroxyl groups of the polyol.

Polyols which can be used for preparing a polyurethane polymer P11 containing isocyanate groups include, for example, the following commercially commonplace polyols, or any desired mixtures of them:

polyoxyalkylene polyols, also called polyether polyols or oligoetherols, which are polymerization products of ethylene oxide, 1,2-propylene oxide, 1,2- or 2,3-butylene oxide, tetrahydrofuran or mixtures of them, optionally polymerized by means of a starter molecule having two or more active hydrogen atoms, such as, for example, water, ammonia or compounds having two or more OH or NH groups, such as, for example, 1,2-ethanediol, 1,2- and 1,3-propanediol, neopentyl glycol, diethylene glycol, triethylene glycol and polyethylene glycols, the isomeric dipropylene glycols, tripropylene glycols, and polypropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and also mixtures of the aforementioned compounds. Use may be made not only of polyoxyalkylene polyols which have a low degree of unsaturation (measured to ASTM D-2849-69 and reported in milliequivalents of unsaturation per gram of polyol (meq/g)), prepared, for example, with the aid of what are called double metal cyanide complex catalysts (DMC catalysts), but also of polyoxyalkylene polyols having a higher degree of unsaturation, prepared, for example, with the aid of anionic catalysts such as NaOH, KOH, CsOH or alkali metal alkoxides.

Particular suitability is possessed by polyoxyalkylene diols or polyoxyalkylene triols, more particularly polyoxypropylene diols or polyoxypropylene triols.

Especially suitable are polyoxyalkylene diols or polyoxyalkylene triols having a degree of unsaturation of less than 0.02 meq/g and having a molecular weight in the range of 1000-30 000 g/mol, and also polyoxypropylene diols and triols having a molecular weight of 400-8000 g/mol. The term "molecular weight" in the present document refers to the molecular weight average $M_n$.

Likewise particularly suitable are what are called ethylene oxide-terminated ("EO-endcapped", ethylene oxide-endcapped) polyoxypropylene polyols. The latter are special polyoxypropylene-polyoxyethylene polyols which are obtained, for example, by subjecting pure polyoxypropylene polyols, more particularly polyoxypropylene diols and triols, after the end of the polypropoxylation reaction, to continued alkoxylation with ethylene oxide, and which as a result contain primary hydroxyl groups.

Styrene-acrylonitrile- or acrylonitrile-methyl methacrylate-grafted polyether polyols.

Polyester polyols, also called oligoesterols, prepared, for example, from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols with organic dicarboxylic acids or their anhydrides or esters, such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid, or mixtures of the aforementioned acids, and also polyester polyols formed from lactones such as ε-caprolactone, for example.

Polycarbonate polyols, of the kind obtainable by reaction, for example, of the abovementioned alcohols—those used to synthesize the polyester polyols—with dialkyl carbonates, diaryl carbonates or phosgene.

Polyacrylate and polymethacrylate polyols.

Polyhydrocarbon polyols, also called oligohydrocarbonols, such as, for example, polyhydroxy-functional ethylene-propylene, ethylene-butylene or ethylene-propylene-diene copolymers, of the kind manufactured, for example, by the company Kraton Polymers, or polyhydroxy-functional copolymers of dienes such as 1,3-butanediene or diene mixtures and vinyl monomers such as styrene, acrylonitrile or isobutylene, or polyhydroxy-functional polybutadiene polyols, of the kind, for example, prepared by copolymerizing 1,3-butadiene and allyl alcohol.

Polyhydroxy-functional acrylonitrile/polybutadiene copolymers, of the kind, for example, preparable from epoxides or amino alcohols and carboxyl-terminated acrylonitrile/polybutadiene copolymers (available commercially under the name Hycar® CTBN from Hanse Chemie).

These stated polyols have an average molecular weight of 250-30 000 g/mol, more particularly of 1000-30 000 g/mol, and an average OH functionality in the range from 1.6 to 3.

Preferred polyols are polyoxyalkylene polyols. Additionally preferred as polyols are diols. Particular preference is given to polyoxyalkylene diols, more particularly those having a degree of unsaturation of less than 0.02 meq/g and a molecular weight in the range of 4000-30 000 g/mol, more particularly 8000-30 000 g/mol.

In addition to these stated polyols it is possible alongside them to use small amounts of low molecular weight dihydric or polyhydric alcohols such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other polyfunctional alcohols, low molecular weight alkoxylation products of the aforementioned dihydric and polyhydric alcohols, and also mixtures of the aforementioned alcohols, when preparing the polyurethane polymer P11.

As polyisocyanates for preparing a polyurethane polymer P11 containing isocyanate groups it is possible for example to use the following commercially commonplace polyisocyanates:

1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, lysine diisocyanate and lysine ester diisocyanate, cyclohexane 1,3- and 1,4-diisocyanate and any desired mixtures of these isomers, 1-isocyanato-3,3,5-trimethyl-5-isocyanatomethylcyclohexane (i.e., isophorone diisocyanate or IPDI), perhydro-2,4'- and -4,4'-diphenylmethane diisocyanate (HMDI), 1,4-diisocyanato-2,2,6-trimethylcyclohexane (TMCDI), 1,3- and 1,4-bis (isocyanatomethyl)cyclohexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl(naphthalene), 2,4- and 2,6-tolylene diisocyanate and any desired mixtures of these isomers (TDI), 4,4'-, 2,4'-, and 2,2'-diphenylmethane diisocyanate and any desired mixtures of these isomers (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODI), oligomers and polymers of the aforementioned isocyanates, and also any desired mixtures of the aforementioned isocyanates. Preference is given to MDI, TDI, HDI, and IPDI.

Used as polymers P in a second embodiment are polymers P2, in which the divalent radical X in formula (I) is —O—CO—NH— or —N(R$^3$)—CO—NH— or —S—CO—NH—. The polymers P2 are obtainable from the reaction of a polymer P21 containing at least two isocyanate-reactive groups with at least one α-isocyanatosilane. This reaction takes place either in a stoichiometric ratio between isocyanate groups and isocyanate-reactive groups, at temperatures of 20° C. to 100° C., for example, where appropriate with accompanying use of catalysts, such that there are no longer any isocyanate groups remaining; or it takes place with a slight excess of isocyanate groups, in which case the α-isocyanatosilane remaining in the polymer after the reaction can be reacted further, with an alcohol, for example. This second embodiment is preferred over the first embodiment which uses polymer P1, since for a given molecular weight the polymers P2 typically have a lower viscosity than the polymers P1, which is advantageous for the application according to the invention.

Examples of suitable α-isocyanatosilanes are (isocyanatomethyl)trimethoxysilane, (isocyanatomethyl)methyldimethoxysilane, (isocyanatomethyl)dimethylmethoxysilane, and also the analogs of the stated α-isocyanatosilanes with ethoxy groups or isopropoxy groups instead of the methoxy groups on the silicon atom. Preferred among the α-isocyanatosilanes are the dialkoxysilanes, more particularly (isocyanatomethyl)methyldimethoxysilane and (isocyanatomethyl)methyldiethoxysilane.

Examples of suitable polymers P21 having at least two isocyanate-reactive groups are the compounds recited below:
  polyols having a molecular weight of at least 2000 g/mol, of the kind already stated as being suitable for the preparation of a polyurethane polymer P11. Polyoxyalkylene polyols are suitable more particularly. Preference is given to polyols having a molecular weight of at least 4000 g/mol. Particularly suitable are polyoxypropylene diols and triols having a degree of unsaturation of less than 0.02 meq/g and having a molecular weight in the range of 4 000-30 000 g/mol, more particularly in the range of 8 000-30 000 g/mol.
  Polyamines having a molecular weight of at least 2000 g/mol and containing at least two amino groups, the amino groups being primary and/or secondary, such as, for example, polyoxyalkylene polyamines, of the kind obtainable, for example, under the name Jeffamine® (from Huntsman Chemicals).
  Polyurethane polymers having terminal hydroxyl groups, primary or secondary amino groups or mercapto groups, with a molecular weight of at least 2000 g/mol, preferably at least 4000 g/mol.
  Polyurethane polymers with terminal hydroxyl groups are obtainable, for example, through the reaction of at least one polyol with at least one polyisocyanate, the OH groups being present in a stoichiometric excess, so that terminal OH groups remain after the reaction. Suitable polyols and polyisocyanates for this reaction are the same commercially commonplace polyols and polyisocyanates as already recited as being suitable for the preparation of polyurethane polymers P11 containing isocyanate groups.

Preferred polymers P21 are polyoxyalkylene polyols having a molecular weight of at least 4000 g/mol. Particular preference is given to polyoxypropylene diols and triols, more particularly polyoxyalkylene diols, having a degree of unsaturation of less than 0.02 meq/g and having a molecular weight in the range of 4 000-30 000 g/mol, more particularly in the range of 8 000-30 000 g/mol. The use of these preferred polyols has the advantage that polymers P2 which are easy to prepare and have a particularly low viscosity are produced, giving compositions having particularly good mechanical properties.

In one particularly preferred embodiment the end groups of the silane-functional polymer P are dialkoxysilane groups, i.e., the value of a in formula (I) is 1, and the silane-functional polymer P is a polymer P2 which is obtainable from the reaction of an α-isocyanatodialkoxysilane and a polymer P21 which is a polyalkoxyalkylene diol, more particularly having a degree of unsaturation of less than 0.02 meq/g and a molecular weight between 4 000 and 30 000 g/mol, more particularly between 8 000 and 30 000 g/mol.

Besides the polymer P with α-functional silane groups, the moisture-curing composition comprises at least one reaction product R, prepared from at least one aminosilane AS having at least one primary amino group and from at least one silane-group-free alkene M which is capable of undergoing 1,4-addition reactions with primary amino groups and will be referred to below as Michael acceptor.

Aminosilanes AS which have at least one primary amino group and are suitable for preparing a reaction product R are compounds of the formula (II)

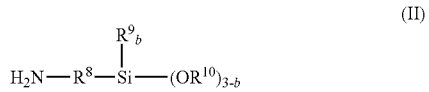

(II)

where
  $R^8$ is a linear or branched, optionally cyclic, alkylene group having 1 to 20 C atoms, optionally with aromatic fractions, and optionally with heteroatoms, more particularly ether oxygen or secondary amine nitrogen,
  $R^9$ is an alkyl group having 1 to 8 C atoms, preferably a methyl group or an ethyl group, more particularly a methyl group,
  $R^{10}$ is an alkyl group having 1 to 5 C atoms, preferably a methyl group or an ethyl group or an isopropyl group, more particularly a methyl group or an ethyl group,
  b is 0, 1 or 2, preferably 0 or 1.

Aminosilanes AS suitable more particularly for preparing a reaction product R are the following commercially commonplace aminosilanes:
  3-aminopropyl-trimethoxysilane, 3-aminopropyldimethoxymethylsilane, 3-amino-2-methylpropyltrimethoxysilane, 4-aminobutyltrimethoxysilane, 4-aminobutyldimethoxymethylsilane, 4-amino-3-methylbutyltrimethoxysilane, 4-amino-3,3-dimethylbutyltrimethoxysilane, 4-amino-3,3-dimethylbutyldimethoxymethylsilane, 2-aminoethyltrimethoxysilane, 2-aminoethyldimethoxymethylsilane, aminomethyltrimethoxysilane, aminomethyldimethoxymethylsilane, aminomethylmethoxydimethylsilane, 7-amino-4-oxaheptyldimethoxymethylsilane, and also their analogs with ethoxy or isopropoxy groups instead of the methoxy groups on the silicon.

Aminosilanes AS suitable more particularly are, furthermore, what are called diaminosilanes, in the form of aminosilanes which as well as a primary amino group carry a secondary amino group (NH group) which more particularly is in γ position relative to the silicon atom. Examples of such diaminosilanes are N-(2-aminoethyl)-3-aminopropylsilanes such as N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, and N-(2-aminoethyl)-3-aminopropyltriisopropoxysilane.

The aminosilane AS is preferably selected from the group consisting of 3-aminopropyltrimethoxysilane, 3-aminopropyltriethoxysilane, N-(2-aminoethyl)-3-aminopropyltrimethoxysilane, N-(2-aminoethyl)-3-aminopropylmethyldimethoxysilane, and N-(2-aminoethyl)-3-aminopropyltriethoxysilane, more particularly from the group consisting of N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, and N-(2-aminoethyl)-3-aminopropyltriisopropoxysilane.

Michael acceptors suitable for preparing a reaction product R are monofunctional or polyfunctional. Suitable monofunctional Michael acceptors are compounds of the formula (III) or (IV)

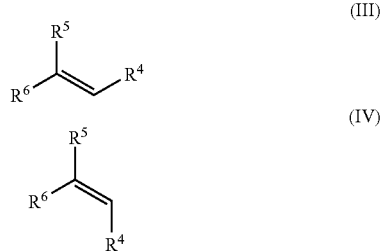

where
$R^4$ is a hydrogen atom or is a radical from the group consisting of $-R^7$, $-COOR^7$, and $-CN$, and
$R^5$ is a radical from the group consisting of $-COOR^7$, $-CONH_2$, $-CONHR^7$, $-CONR^7_2$, $-CN$, $-NO_2$, $-PO(OR^7)_2$, $-SO_2R^7$, and $-SO_2OR^7$, and
$R^6$ is a hydrogen atom or is a radical from the group consisting of $-CH_3$, $-R^7$, $-COOR^7$, and $-CH_2COOR^7$,
where $R^7$ is a monovalent hydrocarbon radical having 1 to 20 C atoms which optionally contains heteroatoms, more particularly ether oxygen atoms.

Examples of suitable monofunctional Michael acceptors are maleic or fumaric diesters such as dimethyl maleate, diethyl maleate, dibutyl maleate, diethyl fumarate; citraconic diesters such as dimethyl citraconate; acrylic or methacrylic esters such as methyl(meth)acrylate, ethyl(meth)acrylate, butyl (meth)acrylate, lauryl(meth)acrylate, stearyl(meth)acrylate, tetrahydrofuryl (meth)acrylate, isobornyl(meth)acrylate; acrylamides or methacrylamides such as (meth)acrylamide, methyl(meth)acrylamide, butyl(meth)acrylamide, dimethyl(meth)acrylamide, dibutyl(meth)acrylamide; itaconic diesters such as dimethyl itaconate; cinnamic esters such as methyl cinnamate; vinylphosphonic diesters such as dimethyl vinylphosphonate; vinylsulfonic esters, more particularly vinylsulfonic aryl esters; vinyl sulfones; vinyl nitriles such as acrylonitrile, crotonitrile, 2-pentenenitrile or fumaronitrile; 1-nitroethylenes such as β-nitrostyrene; and Knoevenagel condensation products, such as those, for example, of malonic diesters and aldehydes such as formaldehyde, acetaldehyde or benzaldehyde. More particularly suitable are maleic diesters, (meth)acrylic esters, (meth)acrylamides, phosphonic diesters, and vinyl nitriles.

Preferred monofunctional Michael acceptors are dimethyl maleate, diethyl maleate, and dibutyl maleate, tetrahydrofurfuryl, isobornyl, hexyl, lauryl, stearyl, 2-hydroxyethyl, and 3-hydroxypropyl(meth)acrylate, (meth)acrylamide, N-methyl(meth)acrylamide, N,N-dimethyl(meth)acrylamide, dimethyl phosphonate, diethyl phosphonate, and dibutyl phosphonate, acrylonitrile, 2-pentenenitrile, fumaronitrile, and β-nitrostyrene, and also mixtures of these compounds.

Suitable polyfunctional Michael acceptors are more particularly compounds having two or more acryloyl, methacryloyl or acrylamide groups, such as, for example, difunctional or polyfunctional acrylates and methacrylates of aliphatic polyethers, polyesters, novolaks, phenols, aliphatic or cycloaliphatic alcohols, glycols and polyester glycols, and also mono- and polyalkoxylated derivatives of the aforementioned compounds, examples being ethylene glycol di(meth)acrylate, tetraethylene glycol di(meth)acrylate, tripropylene glycol di(meth)acrylate, polyethylene glycol di(meth)acrylate, polypropylene glycol di(meth)acrylate, 1,4-butanediol di(meth)acrylate, 1,6-hexanediol di(meth)acrylate, neopentyl glycol di(meth)acrylate, trimethylolpropane tri(meth)acrylate, pentaerythritol tetra(meth)acrylate, dipentaerythritol tetra(meth)acrylate, dipentaerythritol penta(meth)acrylate, dipentaerythritol hexa(meth)acrylate; difunctional or polyfunctional acryloyl- or methacryloyl-functional polybutadienes, polyisoprenes or block copolymers thereof; adducts of difunctional or polyfunctional epoxides with acrylic acid and methacrylic acid; difunctional or polyfunctional polyurethane (meth)acrylates; tris(2-hydroxyethyl)isocyanurate di(meth)acrylate, tris(2-hydroxyethyl)isocyanurate tri(meth)acrylate, tris(2-hydroxyethyl)cyanurate tri(meth)acrylate, N,N',N''-tris(meth)acryloylperhydrotriazine; dihydric or polyhydric (meth)acrylamides such as N,N'-methylenebis(meth)acrylamide, 1,4-bis(meth)acryloylpiperazine, and N,N'-bis(meth)acryloyl-1,6-hexanediamine. Further suitable polyfunctional Michael acceptors are divinyl sulfone, and also copolyesters of glycols, dicarboxylic acids or their esters or anhydrides, and acrylic or methacrylic acid or esters thereof, such as, for example, the polyester acrylates of the type series M-6000, M-7000, M-8000, and M-9000 that are obtainable under the tradename Aronix® from Toagosei.

Preferred polyfunctional Michael acceptors are ethylene glycol di(meth)acrylate, tetraethylene glycol di(meth)acrylate, tripropylene glycol di(meth)acrylate, polyethylene glycol di(meth)acrylate, polypropylene glycol di(meth)acrylate, 1,4-butanediol di(meth)acrylate, 1,6-hexanediol di(meth)acrylate, neopentyl glycol di(meth)acrylate, trimethylolpropane tri(meth)acrylate, pentaerythritol tetra(meth)acrylate, dipentaerythritol tetra(meth)acrylate, dipentaerythritol penta(meth)acrylate, dipentaerythritol hexa(meth)acrylate, and also copolyesters of glycols, dicarboxylic acids or their esters or anhydrides, and acrylic or methacrylic acid or esters thereof, such as, for example, the polyester acrylates of type series M-6000, M-7000, M-8000, and M-9000 that are obtainable under the tradename Aronix® from Toagosei, more particularly the acrylates of these compounds, and also mixtures of these compounds.

Preference as Michael acceptors is additionally given to mixtures of the stated preferred monofunctional and the stated preferred polyfunctional Michael acceptors.

The reaction product R represents an addition product of an aminosilane AS and a Michael acceptor. Where the Michael acceptor is monofunctional, the reaction product has the formula (V)

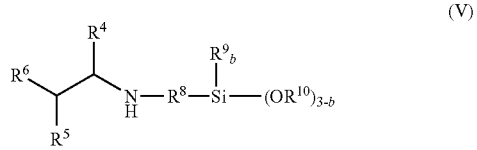

where $R^8$, $R^9$, $R^{10}$, $R^4$, $R^5$, $R^6$, and b have the definitions already described.

Where the Michael acceptor is polyfunctional, the reaction product R is a compound containing one or more silane groups attached via a secondary amino group. Depending on the stoichiometry and conversion rate of the reaction, this reaction product R may also still contain activated double bonds.

The reaction between the aminosilane AS and the Michael acceptor to give the reaction product R takes place under known conditions, of the kind typically used for reactions between primary amines and activated alkenes; for example, at 20 to 150° C., more particularly at 20 to 100° C. The reaction takes place with the use of a solvent or, preferably, in solvent-free form. Where appropriate it is possible to use auxiliaries as well, more particularly catalysts or stabilizers.

The stoichiometry between the aminosilane AS and the Michael acceptor is freely choosable; this means that the molar ratio between the primary amino groups of the aminosilane AS and the activated double bonds of the Michael acceptor need not be precisely stoichiometric. A substoichiometric ratio implies in this case that, in the case of polyfunctional Michael acceptors, the reaction products R include products in which the activated double bonds have undergone only partial reaction. Preference is given to using a stoichiometric or a slightly superstoichiometric ratio, in other words a slight excess of amino groups.

The moisture-curing composition comprising at least one silane-functional polymer P and at least one reaction product R may also be prepared in a one-stage process ("in situ"). This means that the reaction product R is not separately prepared from the aminosilane AS and the Michael acceptor and then mixed with the polymer P, but instead that the reaction product R is formed during or after the conjoint mixing of polymer P, aminosilane AS, and Michael acceptor, in each case in an appropriate proportion to one another.

The presence of at least one reaction product R has the effect of significantly enhancing the adhesion properties of the cured composition, more particularly following severe exposure to moisture, as for example through prolonged immersion in water or as a result of hot steam treatment (for example, at 70° C. and 100% humidity). It has been found that this quality is achieved not least through the fact that the reaction product R is used in the range of 0.1%-10% by weight, preferably 0.3%-5% by weight, based on the overall composition. The reaction product R is employed advantageously in an amount of 0.2%-10% by weight in relation to the silane-functional polymer P.

The observed adhesion-promoting effect of the reaction products R in conjunction with polymers P containing α-functional silane groups is surprising and non-obvious.

The moisture-curing composition of the invention may comprise further components in addition to at least one silane-functional polymer P and at least one reaction product R. It is advantageous, however, to ensure that they do not adversely affect the storage stability, meaning that, during storage, they do not significantly trigger the reaction of the silane groups present in the composition that leads to crosslinking. More particularly this means that such further components contain preferably no water or no more than traces of water. Additional components that may be present include the following auxiliaries and additives:

Plasticizers, examples being esters of organic carboxylic acids or their anhydrides, such as phthalates, examples being dioctyl phthalate or diisodecyl phthalate, adipates, dioctyl adipate for example, and sebacates, polyols, examples being polyoxyalkylene polyols or polyester polyols, organic phosphoric and sulfonic esters or polybutenes; solvents; inorganic and organic fillers, examples being ground or precipitated calcium carbonates, optionally coated with stearates, more particularly finely divided coated calcium carbonate, carbon blacks, especially industrially manufactured carbon blacks (identified below as "carbon black"), kaolins, aluminum oxides, silicas, more particularly highly disperse silicas from pyrolysis operations, PVC powders or hollow beads; fibers, of polyethylene for example; pigments, catalysts, examples being organotin compounds such as dibutyltin dilaurate and dibutyltin diacetylacetonate, organobismuth compounds or bismuth complexes; amino-containing compounds, examples being 1,4-diazabicyclo[2.2.2]octane and 2,2'-dimorpholinodiethyl ether, and also aminosilanes, more particularly the aforementioned aminosilanes AS and secondary aminosilanes such as, for example, N-methyl-3-aminopropyltrimethoxysilane, N-methyl-3-aminopropyldimethoxymethylsilane, N-ethyl-3-amino-2-methylpropyltrimethoxysilane, N-ethyl-3-amino-2-methylpropyldimethoxymethylsilane, N-butyl-3-aminopropyltrimethoxysilane, N-butyl-3-aminopropyldimethoxymethylsilane, N-butyl-4-amino-3,3-dimethylbutyltrimethoxysilane, N-butyl-4-amino-3,3-dimethylbutyldimethoxymethylsilane, N-cyclohexyl-3-aminopropyltrimethoxysilane, N-cyclohexyl-3-aminopropyldimethoxymethylsilane, N-phenyl-3-aminopropyltrimethoxysilane, N-cyclohexylaminomethyltrimethoxysilane, N-phenylaminomethyltrimethoxysilane, N-phenylaminomethyldimethoxymethylsilane; rheology modifiers, such as, for example, thickeners, examples being urea compounds, polyamide waxes, bentonites or fumed silicas; other adhesion promoters, examples being epoxysilanes, (meth)acrylsilanes, anhydridosilanes or adducts of the aforementioned silanes with primary aminosilanes, and also urea silanes; crosslinkers, examples being silane-functional oligomers and polymers; drying agents, such as vinyltrimethoxysilane, α-functional silanes such as N-(silylmethyl)-O-methylcarbamates, more particularly N-(methyldimethoxysilylmethyl)-O-methylcarbamate, (methacryloxymethyl)silanes, methoxymethylsilanes, N-phenyl-, N-cyclohexyl-, and N-alkylsilanes, orthoformic esters, calcium oxide or molecular sieves; stabilizers against heat, light radiation, and UV radiation; flame retardants; surface-active substances, such as wetting agents, flow control agents, deaerating agents or defoamers, for example; fungicides or fungal growth inhibitor substances; and also other substances used typically in moisture-curing compositions.

The moisture-curing composition preferably comprises plasticizers, fillers, and catalysts. Preferred fillers are carbon blacks, calcium carbonates, more particularly finely divided, coated calcium carbonates, highly disperse silicas from pyrolysis processes, and combinations of these fillers. Preferably the composition contains between 5% and 35% by weight, more particularly between 10% and 20% by weight, of carbon black.

The moisture-curing composition described is kept under moisture-free conditions. It is storage stable—that is, under moisture-free conditions, it can be kept in a suitable pack or facility, such as a drum, a pouch or a cartridge, for example, over a period ranging from several months up to a year or more, without suffering, to any service-relevant extent, any change in its performance properties or in its properties after curing. Typically the storage stability is determined via measurement of the viscosity, extrusion volume or extrusion force.

The composition preferably contains no free isocyanate groups. An isocyanate-free composition of this kind is advantageous from the toxicological standpoint.

When the moisture-curing composition described is applied to at least one solid body or article, the silane groups of the polymer and of the silanes come into contact with moisture. The silane groups have the property of hydrolyzing on contact with moisture. This is accompanied by formation of organosilanols (organosilicon compounds containing one or more silanol groups, Si—OH groups) and, as a result of subsequent condensation reactions, of organosiloxanes (organosilicon compounds containing one or more siloxane groups, Si—O—Si groups). As the outcome of these reactions, which may be accelerated through the use of catalysts, the composition finally cures; this process is also referred to as crosslinking. The water required for the curing reaction may either come from the air (atmospheric humidity), or else the composition may be contacted with a water-containing component, by being spread-coated, for example, with a smoothing agent, or by being sprayed, or else the composition during application can have a water-containing component added to it, in the form for example of a hydrous paste, which is mixed in via a static mixer, for example.

The composition described cures rapidly on contact with moisture. In the cured state the composition possesses high mechanical strength in combination with high extensibility, and also good adhesion properties, even after severe moisture exposure. This makes it suitable for a multiplicity of applications, more particularly as an elastic adhesive, as an elastic sealant or as an elastic coating. It is suitable more particularly for applications which require a high cure rate and impose exacting requirements on strength and early and final strength as well as on extensibility, in tandem with exacting requirements on the adhesion properties. It is especially suitable for applications in which the cured composition is exposed to moisture, in particular to a combination of heat and moisture.

Examples of suitable applications include the adhesive bonding of components in construction or civil engineering and in the manufacture or repair of industrial products or consumer goods, more particularly of windows, household appliances or means of transport, such as water or land vehicles, preferably automobiles, buses, trucks, trains or boats; the sealing of joints, seams or cavities in industrial manufacture or repair, or in construction or civil engineering; and the coating of various substrates, in the form for example of a paint, varnish, primer, sealant or protective coating, or as a floor covering, for offices, living areas, hospitals, schools, warehouses, and vehicle parking facilities, for example.

In one preferred embodiment the composition described is used as an elastic adhesive or sealant.

As an elastic adhesive, the composition typically has a breaking elongation of at least 200% and, as an elastic sealant, it has a breaking elongation of at least 500% at room temperature.

In its application as an adhesive, the composition is applied to a substrate S1 and/or a substrate S2. The adhesive may therefore be applied to one substrate or the other or to both substrates. Thereafter the parts to be bonded are joined, whereupon the adhesive cures. Here it should be ensured that the joining of the parts takes place within the time known as the open time, in order to ensure that both adherends are reliably bonded to one another.

In its application as a sealant, the composition is applied between the substrates S1 and S2 and is subsequently cured. Typically the sealant is injected into a joint.

The adhesive or sealant is preferably applied evenly.

In both applications the substrate S1 may be the same as or different than substrate S2.

Suitable substrates S1 or S2 are, for example, inorganic substrates such as glass, glass ceramic, concrete, mortar, brick, tile, gypsum and natural stones such as granite or marble; metals or alloys such as aluminum, steel, nonferrous metals, galvanized metals; organic substrates such as wood, plastics such as PVC, polycarbonates, PMMA, polyesters, epoxy resins; coated substrates such as powder-coated metals or alloys; and also paints and finishes, more particularly automotive topcoats.

If necessary the substrates can be pretreated prior to the application of the adhesive or sealant. Pretreatments of this kind include more particularly physical and/or chemical cleaning techniques, examples being abrading, sandblasting, brushing or the like, or treatment with cleaners or solvents, or the application of an adhesion promoter, adhesion promoter solution or primer.

After the substrates S1 and S2 have been adhesively bonded or sealed by means of a composition of the invention, an adhesively bonded or sealed article is obtained. An article of this kind may be a built structure, more particularly a built structure in construction or civil engineering, or a means of transport. The article is preferably a means of transport, for example a water or land vehicle, more particularly an automobile, a bus, a truck, a train or a boat, or a component thereof. Particularly preferably, the adhesively bonded or sealed article is a means of transport, in particular an automobile or a component of a means of transport, in particular of an automobile.

If the composition is used as an adhesive for elastic bonds in vehicle construction, it preferably has a pastelike consistency with properties of structural viscosity. An adhesive of this kind is applied to the substrate by means of a suitable apparatus, preferably in the form of a bead having a substantially circular or triangular cross-sectional area. Suitable methods of application of the adhesive are, for example, application from conventional cartridges which are operated manually or by means of compressed air, or from a drum or hobbock by means of a conveying pump or an extruder, where appropriate by means of an application robot. An adhesive having good application properties features high firmness of consistency and short stringing. That is, it remains in the applied form following application, in other words does not run apart, and, after the application device has been set down, the adhesive forms very short string, if any at all, so that the substrate is not fouled.

Elastic bonds in vehicle construction are, for example, the adhesive attachment of parts, such as plastic covers, trim strips, flanges, bumpers, driver's cabs or other components for mounting, to the painted bodywork of a means of transport, or the adhesive installation of glass into the bodywork. Examples of vehicles to be mentioned include automobiles, trucks, buses, rail vehicles, and boats.

It has been found that the composition of the invention comprising at least one polymer P and at least one reaction product R, prepared from at least one aminosilane AS having at least one primary amino group and from at least one monofunctional or polyfunctional Michael acceptor, has surprisingly good adhesion properties. More particularly, in comparison with a composition without reaction product R, it exhibits better adhesion properties after severe exposure of the bond face to moisture, for example as a result of prolonged immersion in water or of hot steam treatment (for example, 70° C./100% humidity).

EXAMPLES

Description of Test Methods

The tensile strength and the elongation at break were determined to DIN EN 53504 (tensioning rate: 200 mm/min) over 7 days under standard conditions (23∀1° C., 50∀5% relative humidity) on cured films with a layer thickness of 2 mm.

The lap shear strength was measured in a method based on DIN EN 1465. Float glass plaques were used which had been cleaned with Sika® Cleaner 205 (available from Sika Schweiz AG) beforehand. The glass plaques were arranged, in the manner described in the standard, so as to produce an adhesive-filled overlap measuring 10 to 12 mm in width, 25 mm in length, and 4 to 5 mm in thickness. For curing, the test specimen was stored for 7 days under standard conditions (23±1° C., 50±5% relative humidity). Subsequently the test specimen was pulled apart to fracture with a crosshead sphere of 20 mm/min.

The adhesions were determined as follows:

To test the adhesion, the following substrates were used, in the form of plaques: aluminum AlMg3, glass ceramic VSG, glass ceramic based jointly on ESG and floatglass, obtainable from Rocholl, Schönbrunn, Germany. Each plaque was cleaned with Sika® Cleaner 205. After a flash-off time of 10 minutes, two beads of each polyurethane composition were applied from a cartridge to each plaque. The bead-coated plaque was then stored for 7 days under standard conditions (23±1° C., 50±5% relative humidity), after which the adhesion was tested a first time (first bead). Subsequently the plaque was stored fully immersed in water at room temperature for 7 days, whereupon the adhesion was tested a second time (second bead). To test the adhesion, an incision was made into one end of the cured bead just above the surface of the plaque (bond face). The incised end of the bead was held by hand and then pulled carefully and slowly from the plaque surface with a peeling action in the direction of the other end of the bead. If, in the course of this removal, the adhesion was so strong that the end of the bead threatened to tear off when being pulled, a cutter was used to apply a cut perpendicular to the bead-pulling direction down to the bare surface of the plaque, and in this way a section of bead was detached. Cuts of this kind were repeated, if necessary, in the course of continued pulling, at intervals of 2 to 3 mm. In this way the entire bead was pulled and/or cut from the plaque. The adhesion properties were evaluated on the basis of the cured adhesive which remained on the substrate surface after the bead had been removed (cohesive fracture), this being accomplished by estimating the cohesive fraction of the adhesion area, in accordance with the following scale:

1=more than 95% cohesive fracture
2=75%-95% cohesive fracture
3=25%-75% cohesive fracture
4=less than 25% cohesive fracture Test results with cohesive fracture values of less than 75%, i.e., scores of 3 and 4, are considered inadequate.

The OH number of the polyol used was determined by reaction with an excess of isophorone diisocyanate and subsequent back-titration of the unreacted isocyanate groups. The value of the OH number was not corrected for the water present in the polyol. The OH number stated thus includes water.

Abbreviations Used in Table 1
comp. comparative
Dynasylan® DAMO N-(2-aminoethyl)-3-aminopropyltrimethoxysilane (Degussa)

a) Preparation of a Polymer P with α-Functional Silane Groups

Polymer 1

In the absence of moisture, 1000 g of Acclaim® 18200 polyol (Bayer; low monol polyoxypropylenediol, average molecular weight about 18 000 g/mol, OH number 7.34 mg KOH/g) and 21.1 g of Geniosil® XL 42 (Wacker; isocyanatomethylmethyldimethoxysilane) were reacted at 90° C. until free isocyanate was no longer detectable by means of FT-IR spectroscopy. The resulting polymer, with α-functional silane groups, was cooled to room temperature and kept in the absence of moisture. The clear, colorless product had a viscosity of 40 Pas at 20° C.

b) Preparation of Reaction Products R

Reaction Product 1

17.9 g (100 mmol) of 3-aminopropyltrimethoxysilane (Silquest® A-1110, GE Advanced Materials) were admixed slowly dropwise, in the absence of moisture and with thorough stirring, with 17.2 g (100 mmol) of diethyl maleate and the mixture was then stirred for 2 hours. This gave a colorless liquid having a viscosity at 20° C. of 60 mPa·s.

Reaction Product 2

17.9 g (100 mmol) of 3-aminopropyltrimethoxysilane (Silquest® A-1110, GE Advanced Materials) were admixed slowly dropwise, in the absence of moisture and with thorough stirring, with 15.6 g (100 mmol) of tetrahydrofurfuryl acrylate and the mixture was then stirred for 2 hours at 60° C. This gave a colorless liquid having a viscosity at 20° C. of 270 mPa·s.

Reaction Product 3

17.9 g (100 mmol) of 3-aminopropyltrimethoxysilane (Silquest® A-1110, GE Advanced Materials) were admixed slowly dropwise, in the absence of moisture and with thorough stirring, with 13.6 g (100 mmol) of freshly distilled dimethyl vinylphosphonate and the mixture was then stirred for 2 hours at 60° C. This gave a colorless liquid having a viscosity at 20° C. of 300 mPa·s.

Reaction Product 4

22.2 g (100 mmol) of N-(2-aminoethyl)-3-aminopropyltrimethoxysilane (Dynasylan® DAMO, Degussa) were admixed slowly dropwise, in the absence of moisture and with thorough stirring, with 5.3 g (100 mmol) of acrylonitrile and the mixture was then stirred for 2 hours at 60° C. This gave a colorless liquid having a viscosity at 20° C. of 30 mPa·s.

Reaction Product 5

22.2 g (100 mmol) of N-(2-aminoethyl)-3-aminopropyltrimethoxysilane (Dynasylan® DAMO, Degussa) were admixed slowly dropwise, in the absence of moisture and with thorough stirring and waterbath cooling with 9.9 g (100 mmol) of N,N-dimethylacrylamide and the mixture was then stirred for 2 hours at 60° C. This gave a colorless liquid having a viscosity at 20° C. of 50 mPa·s.

Reaction Product 6

Prepared in situ (in the preparation of example 7) with 56% by weight of N-(2-aminoethyl)-3-aminopropyltrimethoxysilane (Dynasylan® DAMO, Degussa) and 44% by weight of Aronix® M-8060 polyester acrylate (Toagosei, Japan).

c) Production of Adhesives
Base Formulation

In a vacuum mixer, 3250 g of polymer 1, 1170 g of diisodecyl phthalate (DIDP; Palatinol® Z, BASF), 65 g of N-(methyldimethoxysilylmethyl)-O-methylcarbamate (Geniosil® XL 65, Wacker), 975 g of finely divided, coated calcium carbonate (Socal® U1S2, Solvay, dried), 975 g of carbon black (dried), and 0.4 g of di-n-butyltin dilaurate were processed to a homogeneous paste which was kept in the absence of moisture.

Examples 1 to 7

In a vacuum mixer, the base formulation was mixed homogeneously at room temperature with the silanes indicated for examples 1 to 7 in table 1, and the resultant adhesives were dispensed into cartridges in the absence of moisture.

Test specimens were prepared from these compositions the next day, in the manner described. The compositions and results of these samples, after the described curing and storage, are compiled in table 1.

TABLE 1

Composition and test results of the adhesives of examples 2-7 (inventive) and example 1 (comparative).

| Example | 1 (comp.) | 2 | 3 | 4 | 5 | 6 | 7 |
|---|---|---|---|---|---|---|---|
| Base formulation | 98.0 | 98.0 | 98.0 | 98.0 | 98.0 | 98.0 | 98.0 |
| Dynasylan ® DAMO | 2.0 | — | — | — | — | — | — |
| Reaction product 1 | — | 2.0 | — | — | — | — | — |
| Reaction product 2 | — | — | 2.0 | — | — | — | — |
| Reaction product 3 | — | — | — | 2.0 | — | — | — |
| Reaction product 4 | — | — | — | — | 2.0 | — | — |
| Reaction product 5 | — | — | — | — | — | 2.0 | — |
| Reaction product 6 (prepared in situ) | — | — | — | — | — | — | 2.0 |
| Results of mechanical tests: | | | | | | | |
| Tensile strength [MPa] | 6.9 | 7.4 | 7.2 | 7.2 | 7.1 | 7.5 | 7.4 |
| Elongation at break [%] | 710 | 910 | 870 | 900 | 810 | 850 | 880 |
| Lap shear strength [MPa] | 3.8 | 4.2 | 4.2 | 4.0 | 4.6 | 4.6 | 4.4 |
| Results of adhesion tests *: | | | | | | | |
| Aluminum AlMg3 | 1 4 | 1 2 | 1 2 | 1 1 | 1 1 | 1 1 | 1 1 |
| Glass ceramic VSG | 1 4 | 1 1 | 1 2 | 1 2 | 1 1 | 1 1 | 1 1 |
| Glass ceramic ESG | 2 4 | 1 4 | 2 4 | 1 4 | 1 1 | 1 1 | 1 1 |
| Floatglass | 1 4 | 1 2 | 1 1 | 1 2 | 1 1 | 1 1 | 1 1 |

Amounts are in parts by weight.
* 1st number: after 7 days' storage under standard conditions; 2nd number: after 7 days' storage under standard conditions and a further 7 days' water storage From table 1 it is apparent that all of the adhesives have very good mechanical properties in the cured state.

The adhesive of comparative example 1, which contains no reaction product R, exhibits good adhesion on all test substrates after 7 days' storage under standard conditions. If, however, the test specimen is subsequently placed in water at room temperature for 7 days, the adhesion is lost.

The inventive adhesives of examples 2 to 7 exhibit a distinct improvement in adhesion after water storage as compared with example 1.

The invention claimed is:

1. A moisture-curing composition comprising
a) at least one silane-functional polymer P having at least two end groups of the formula (I)

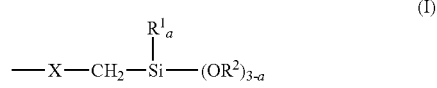

where
R$^1$ is an alkyl group having 1 to 8 C atoms;
R$^2$ is an alkyl group having 1 to 5 C atoms;
a is 0, 1 or 2; and
X is a divalent radical selected from the group consisting of —NH—CO—N(R$^3$)—, —NH—CO—S—, —NH—CO—O—, —O—CO—NH—, —N(R$^3$)—CO—NH—, and —S—CO—NH—, where R$^3$ is a hydrogen atom or is a linear or branched hydrocarbon radical having 1 to 20 C atoms which optionally contains cyclic fractions and which optionally has at least one functional group selected from the group consisting of alkoxysilyl, ether, sulfone, nitrile, nitro, carboxylic ester, sulfonic ester, and phosphonic ester;
b) at least one reaction product R prepared from
at least one aminosilane AS having at least one primary amino group, and
at least one silane-group-free alkene M which is capable of undergoing 1,4-addition reactions with primary amino groups.

2. The moisture-curing composition of claim 1, wherein the aminosilane AS has the formula (II)

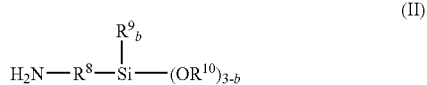

where
R$^8$ is a linear or branched, optionally cyclic, alkylene group having 1 to 20 C atoms, optionally with aromatic fractions, and optionally with heteroatoms,
R$^9$ is an alkyl group having 1 to 8 C atoms,
R$^{10}$ is an alkyl group having 1 to 5 C atoms, and
b is 0, 1 or 2.

3. The moisture-curing composition of claim 2, wherein the aminosilane AS is selected from the group consisting of 3-aminopropyltrimethoxysilane, 3-aminopropyltriethoxysilane, N-(2-aminoethyl)-3-aminopropyltrimethoxysilane, N-(2-amin-oethyl) -3-aminopropylmethyldimethoxysilane, N-(2-aminoethyl)-3-aminopropyltriethoxy -silane, and N-(2-aminoethyl)-3-aminopropyltriisopropoxysilane, 4. The moisture-curing composition of claim 1, wherein the silane-group-free alkene M is a Michael acceptor and has the formula (III) or (IV)

-continued

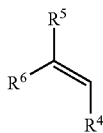
(IV)

where
R⁴ is a hydrogen atom or is a radical from the group consisting of —R⁷, —COOR⁷, and —CN, and
R⁵ is a radical from the group consisting of —COOR⁷, —CONH₂, —CONHR⁷, —CONR⁷₂, —CN, —NO₂, —PO(OR⁷)₂, —SO₂R⁷, and —SO₂OR⁷, and
R⁶ is a hydrogen atom or is a radical from the group consisting of —CH₃, —R⁷, —COOR⁷, and —CH₂COOR⁷,
where R⁷ is a monovalent hydrocarbon radical having 1 to 20 C atoms which optionally contains heteroatoms.

5. The moisture-curing composition of claim 1, wherein the silane-group-free alkane M is a Michael acceptor and contains two or more functional groups which are able to undergo 1,4-addition reactions with primary amino groups.

6. The moisture-curing composition of claim 5, wherein the silane-group-free alkene M is a Michael acceptor and contains two or more acryloyl, methaciyloyl or acrylamide groups.

7. The moisture-curing composition of claim 1, wherein a is 1.

8. The moisture-curing composition of claim 1, wherein the silane-functional polymer P is a silane-functional polymer P1 for which X in formula (I) is —NH—CO—N(R³)— or —NH—CO—S— or —NH—CO—O—, and which is obtainable from the reaction of a polyurethane polymer P11 which contains isocyanate groups.

9. The moisture-curing composition of claim 1, wherein the silane-functional polymer P is a silane-functional polymer P2 for which X in formula (I) is —O—CO—NH— or —N(R³)—CO—NH— or —S—CO—NH—, and which is obtainable from the reaction of a polymer P21 containing at least two isocyanate-reactive groups with at least one α-isocyanatosilane.

10. The moisture-curing composition of claim 9, wherein the polymer P21 containing at least two isocyanate-reactive groups is a polyol.

11. The moisture-curing composition of claim 9, wherein the α-isocyanatosilane is (isocyanatomethyl)methyldimethoxysilane or (isocyanatomethyl)-methyldiethoxysilane.

12. The moisture-curing composition of claim 1, wherein a is 1 and the silane-functional polymer P is a silane-functional polymer P2 which is prepared from the reaction of an α-isocyanatodialkoxysilane with a polyoxyalkylenediol P21.

13. The moisture-curing composition of claim 1, wherein the fraction of the reaction product R in the composition is 0.1% to 10% by weight.

14. The moisture-curing composition of claim 1, wherein the reaction product R is used in an amount of 0.2%-10% by weight in relation to the silane-functional polymer P.

15. The moisture-curing composition of claim 1, wherein the reaction product R is prepared in situ from the aminosilane AS and the silane-group-free alkene M.

16. The moisture-curing composition of claim 1, wherein the composition further comprises at least one plasticizer and/or at least one filler and/or at least one catalyst for the reactions of the silane groups.

17. A method of adhering, sealing or coating, comprising applying a moisture-curing composition of claim 1 to a component as an adhesive, sealant or coating.

18. The method of claim 17, wherein the composition is applied for the adhesive bonding of components in construction or civil engineering or in the manufacture or repair of industrial goods or consumer goods.

19. The method of claim 17, wherein the composition is applied for the sealing of joints, seams or cavities in industrial manufacture or repair, or in construction or civil engineering.

20. A method of adhesively bonding substrates S1 and S2, comprising the steps of
applying a composition of claim 1 to a substrate S1 and/or a substrate S2,
contacting the substrates S1 and S2 via the applied composition,
curing the composition by contact with moisture, the substrates S1 and S2 being alike or different from one another.

21. The method of claim 20, wherein at least one of the substrates S1 or S2 is glass, glass ceramic, concrete, mortar, brick, tile, plaster, or natural stone; a metal or an alloy; a wood or a plastic; a powder coating, a paint or a finish.

22. An adhesively bonded article produced by a method of adhesive bonding of claim 20.

23. The adhesively bonded article of claim 22, wherein the article is a built structure, an industrial product or a means of transport, or a part thereof.

24. A method of sealing, comprising the steps of
applying a composition of claim 1 between a substrate S1 and a substrate S2,
curing the composition by contact with moisture the substrates S1 and S2 being alike or different from one another.

25. A sealed article produced by a method of sealing of claim 24.

* * * * *